United States Patent [19]

Black

[11] Patent Number: 4,972,660
[45] Date of Patent: Nov. 27, 1990

[54] POUCH FOR HORSE'S TAIL

[76] Inventor: Andrew J. Black, 4340 S. Newstead Rd., Akron, N.Y. 14001

[21] Appl. No.: 366,496

[22] Filed: Jun. 14, 1989

[51] Int. Cl.$^5$ .............................................. B68B 5/04
[52] U.S. Cl. ..................................................... 54/78
[58] Field of Search ...................... 54/78; 119/95, 105, 119/128

[56] References Cited

U.S. PATENT DOCUMENTS

| | | |
|---|---|---|
| D. 31,285 | 7/1899 | McClellan . |
| 127,918 | 6/1872 | Parson et al. . |
| 148,367 | 3/1874 | Howard .................................. 54/78 |
| 209,737 | 11/1878 | Weide . |
| 212,836 | 3/1879 | Briggle . |
| 385,721 | 7/1888 | Muntz . |
| 468,796 | 2/1892 | Derickx . |
| 587,763 | 8/1897 | Sharp . |
| 1,064,707 | 6/1913 | Canion . |
| 1,343,147 | 6/1920 | Liechty .................................... 54/78 |
| 1,991,299 | 2/1935 | Swaggerty ............................... 54/22 |
| 2,150,526 | 3/1939 | Swaggerty ............................... 54/78 |
| 2,487,005 | 11/1949 | Walker ..................................... 54/78 |
| 4,378,667 | 4/1983 | Velarde, Jr. ............................. 54/78 |
| 4,813,949 | 3/1989 | O'Rourke .......................... 119/95 X |

FOREIGN PATENT DOCUMENTS 2463579  4/1981  France .................... 119/95

*Primary Examiner*—Robert P. Swiatek
*Attorney, Agent, or Firm*—Joseph P. Gastel

[57] ABSTRACT

A pouch for a horse's tail which has been braided and looped lengthwise into a plurality of loops extending through a space between the strands at the base of the braid including an elongated tubular body portion having a closed end, an open end for receiving the braided and looped tail, a longitudinally extending fly extending into the tubular body portion from the open end, a fastening tab having a stem formed integrally with the body portion and extending away from the open end for insertion into the space between the strands of the horse's tail at the base of the braided portion, and an elongated portion on the fastening tab at the outer end of the stem and extending perpendicularly thereto to form a T therewith, and fastening material on the elongated portion for attachment circumferentially to the periphery of the tubular body portion proximate the open end.

10 Claims, 2 Drawing Sheets

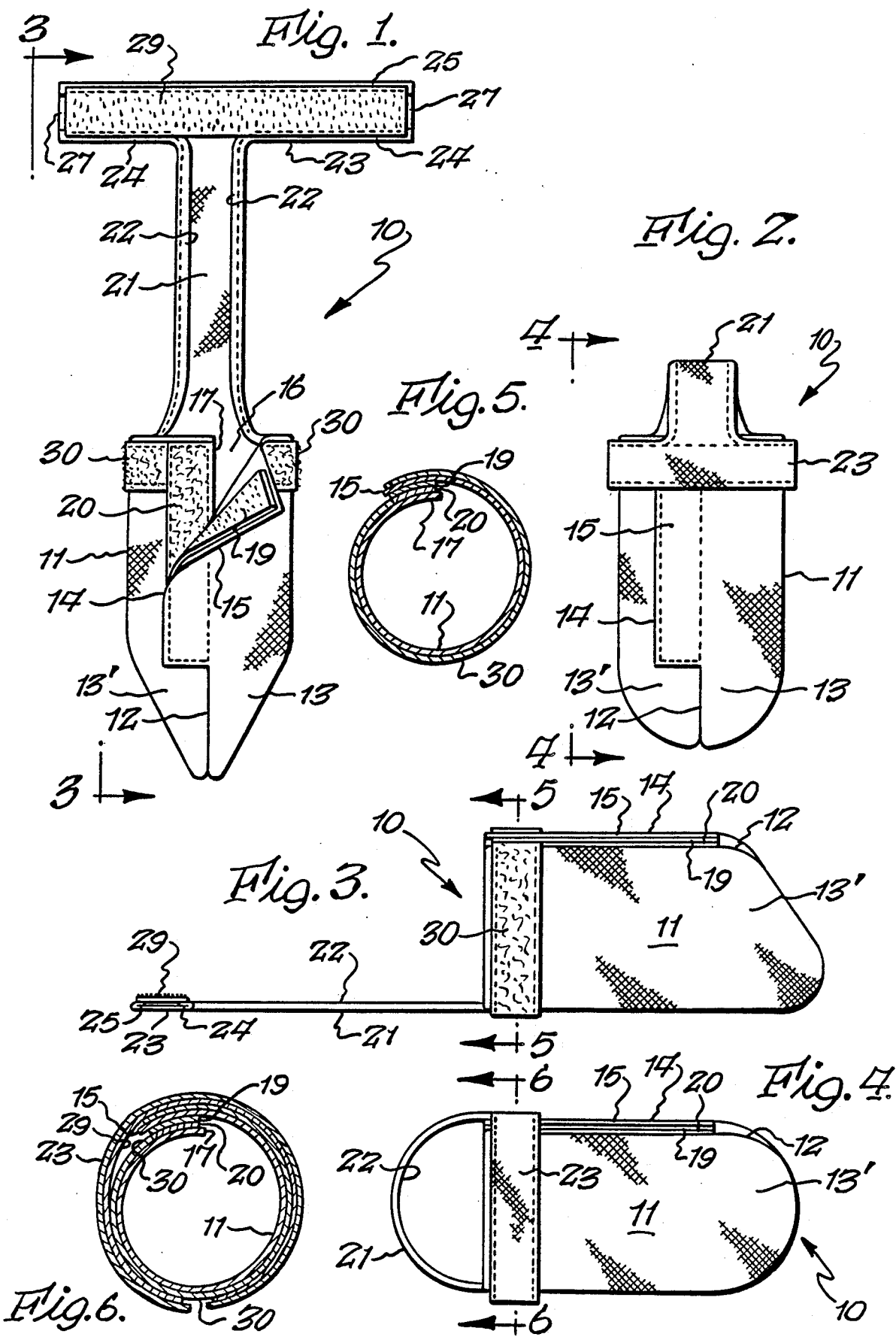

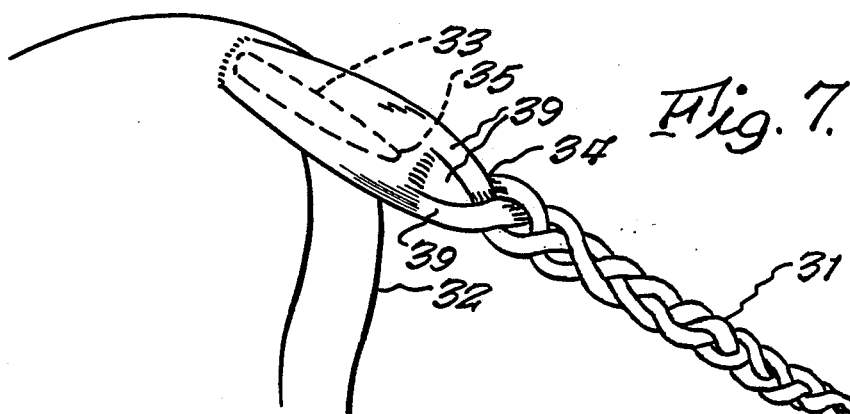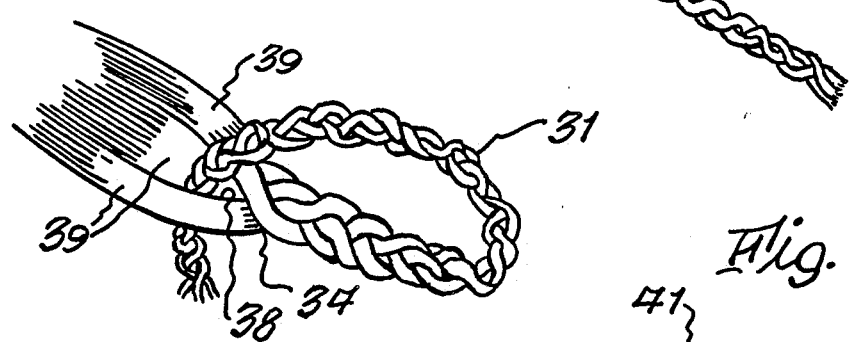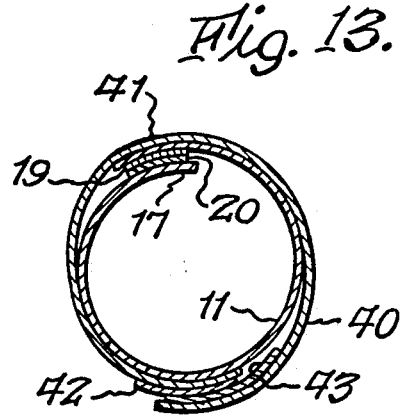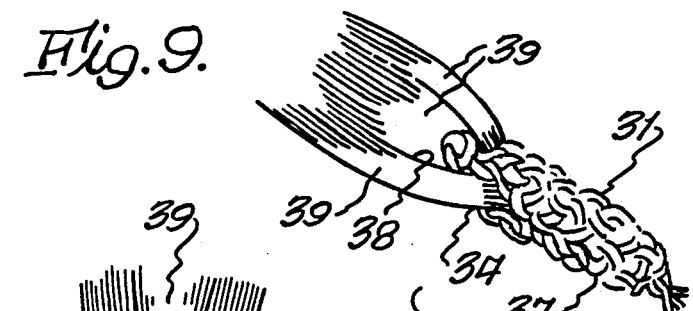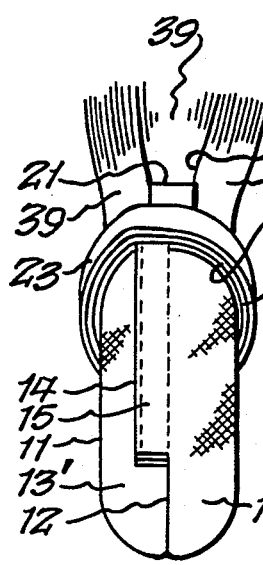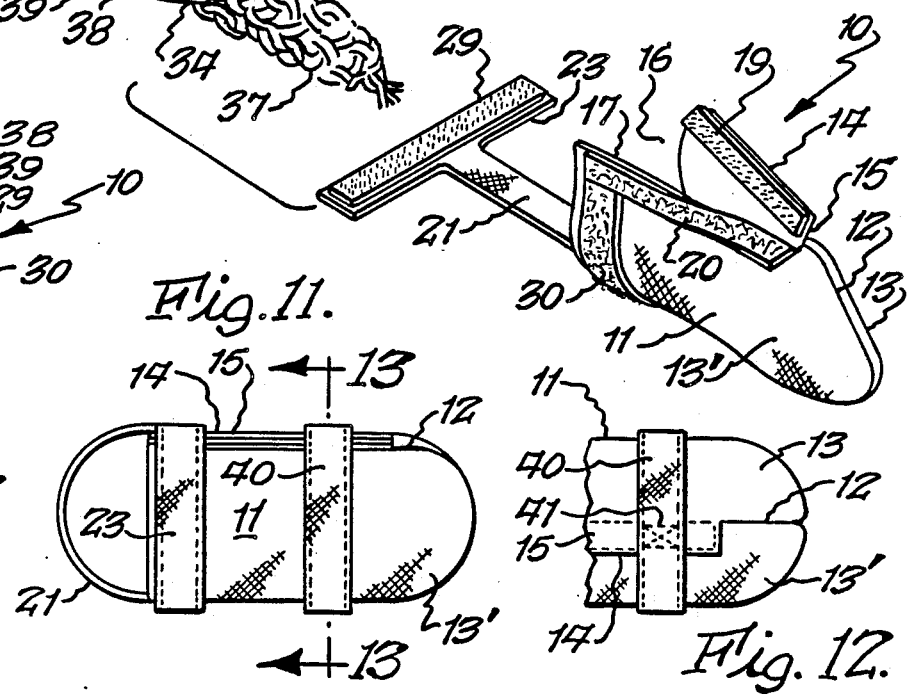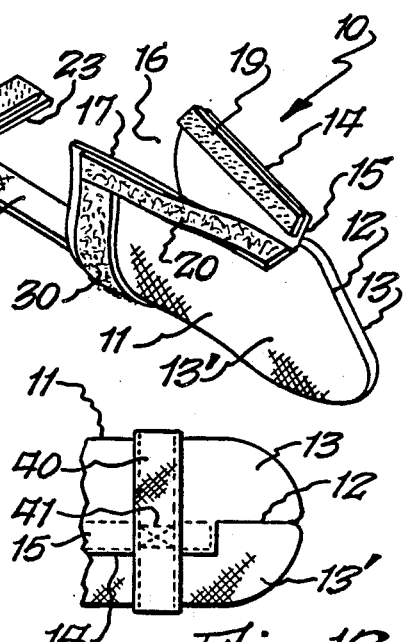

POUCH FOR HORSE'S TAIL

BACKGROUND OF THE INVENTION

The present invention relates to a tail pouch for a horse's tail

By way of background, Arabian thoroughbred show horses have their tails bound for cleanliness and show purposes. Their tails, in normal condition, drag about two feet on the ground. Included in the upper end of their tail is a tail bone which is about one foot long. In the past, their tails were braided with a three-strand braid from about a few inches below their tail bone to the end thereof. Thereafter, the braided tail was continually looped between two of the strands to provide a bundle or ball or ball a few inches long. This ball was then bound with a gauze-like tape. If the tail was tied too tightly, it could be broken off, which would destroy the horse for show purposes until the tail regrew to its normal length in a relatively long time, up to about two years. Furthermore, about 10 to 15 feet of the gauze-like material was required to wrap the tail, and this material could be reused up to ten times. However, it was expensive. Furthermore, it is extremely time-consuming and bothersome to both wrap the tail with this type of gauze and also unwrap it. Additionally, the tail could be injured by cutting during the removal of the tape. It is with overcoming the foregoing deficiencies that the present invention is concerned.

SUMMARY OF THE INVENTION

It is accordingly one object of the present invention to provide a tail pouch for a braided, looped tail bundle of a horse which can be mounted quickly with very little effort and when mounted it will be retained neatly in position.

Another object is to provide an improved tail pouch for a braided, looped horse's tail which is fabricated from stretchable, breathable, washable, durable material which will permit ventilation of the horse's tail, which will be long-wearing, and which can be used and reused for long periods of time. Other objects and attendant advantages of the present invention will readily be perceived hereafter.

The present invention relates to a pouch for a horse's tail which has been braided from a plurality of strands and folded lengthwise into a bundle comprising an elongated tubular body portion of planar material having an open end for receiving said braided horse's tail which has been folded lengthwise, a periphery on said body portion at said open end, a fastening tab having a first portion secured to said body portion and extending outwardly away from a first location at said periphery at said open end, a second portion on said fastening tab remote from said first portion, a central portion on said tab between said first and second portions for looping through the space between said strands at the base of said braided tail, and fastening means on said second portion for attachment to said body portion at a second location circumferentially distant from said first location.

The various aspects of the present invention will be more fully understood when the following portions of the specification are read in conjunction with the accompanying drawings wherein:

BRIEF DESCRIPTION OF THE DRAWINGS

FIG. 1 is a side elevational view of the tail pouch with the fly on the body in a partially open position and with the retaining flap extended;

FIG. 2 is a side elevational view but with the fly closed and the retaining flap in the position which it assumes when the tail pouch is fully mounted on the horse's tail;

FIG. 3 is a side elevational view taken substantially in the directional of arrows 3—3 of FIG. 1 but with the body flap opened;

FIG. 4 is a side elevational view taken substantially in the direction of arrows 4—4 of FIG. 2;

FIG. 5 is a cross sectional view taken substantially along line 5—5 of FIG. 3;

FIG. 6 is a cross sectional view taken substantially along line 6—6 of FIG. 4;

FIG. 7 is a fragmentary view of the rear end of a horse with a tail which has been braided;

FIG. 8 is a fragmentary view of the braided tail which is in the process of being looped through an opening in the base of the braid;

FIG. 9 is a fragmentary view of a completely looped braided tail and the tail pouch in position for receiving the looped tail;

FIG. 10 is a fragmentary view of the looped tail fully installed within the tail pouch;

FIG. 11 is a side elevational view of a modified embodiment of the tail pouch;

FIG. 12 is a fragmentary view of the end portion of the tail pouch rotated 90° from the position of FIG. 11; and FIG. 13 is a cross sectional view taken substantially along line 13—13 of FIG. 11.

DESCRIPTION OF THE PREFERRED EMBODIMENTS

The improved horse tail pouch 10 of the present invention includes a tubular body portion 11 preferably fabricated out of a fabric and more particularly a stretch type of fabric, but it may be fabricated out of any suitable flexible planar sheet material. The body portion 11 includes a bottom seam 12 having a portion 13 on one side of the tubular body portion and a portion 13' which is a continuation of portion 13 on the diametrically opposite side of body portion 11. A fly 14 is provided which extends lengthwise of tubular body portion 11 away from the open end 16 of the body portion 11. Fly 14 is formed as shown in FIGS. 1 and 2. The fly includes a portion 17 which lies under flap 15 when the latter is in the position of FIG. 2. Cooperating hook and pile fabric 19 and 20 are located on flap 15 and portion 17, respectively, so that fly 14 can be selectively opened to the condition shown in FIG. 9 or closed to the condition shown in FIG. 2. Preferably material 19 is hook fabric and material 20 is pile fabric so that the hook fabric can be located away from the horse's tail during mounting of tubular body portion 11 thereon to thus not tend to snag onto the tail.

Formed integrally as an extension of body portion 11 is a tab which includes stem 21 which has sewn hems 22 thereon so that the raw edges of stem 21 are not exposed. Stem 21 terminates at T portion 23 which also has sewn hems 24, 25 and 27 thereon. A strip of hook fabric 29 is sewn to T portion 23 as shown in FIG. 1. A strip of pile fabric 30 is sewn around the entire upper periphery of bady portion 11 proximate the open end 16.

The body portion 11 is approximately 5 inches long and approximately 2 inches in diameter at its open end. Stem 21 is approximately 5 inches long and T member 23 is approximately 6½ inches long. The fly 14 is approximately 4 inches long.

As explained previously, the improved tail pouch of the present invention is for containing the braided looped tail 31 of horse 32. In this respect, there are certain horses, such as Arabian thoroughbreds, which have tails which drag about two feet on the ground and get dirty. These tails are braided and looped up into a ball for cleanliness and show purposes and to avoid damage. In this respect, the horse has a tail bone 33 which is approximately 1 foot long. The upper portion of tail 31 surrounds the tail bone 33 and extends beyond it. The braiding commences at 34 which is about a person's hand's width below the end 35 of the tail bone. This procedure can also be effected with Arabian half-breds, Angloid Arab horses and Dutch warm bloods an others.

After the tail has been braided as depicted in FIG. 7, it is looped, as depicted in FIG. 8 until a plurality of loops are formed at 37 (FIG. 9). The loops extend through a space 38 between two of the strands 39 at the base of the three-strand braid 31. Thus a ball is formed which may be 6 to 7 inches long. Thereafter, as depicted in FIG. 9, the fly 14 is opened and the looped ball 37, which is essentially the folded tail, is inserted into body portion 11 and thereafter the fly is closed by attaching the hook and pile fabric 17-19 together. Thereafter, the T portion 23 is inserted through a space, such as 38, between two of the stands 39 which form the braid. The hook fabric 29 of T portion 23 is then mated with the pile fabric 30 in the manner shown in FIGS. 2, 4 and 10. By virtue of the foregoing connection, the tail pouch 10 cannot possibly slip downwardly on the horse's tail. Furthermore, the many layers of material which exist around the open end of body portion 11 when the T portion is in its fully installed position will provide a good substantial construction which keeps the tail pouch square on the horse's tail, that is, it will not sag or slide or cant or cock with the horse's tail movement.

In FIGS. 11-13 a modified embodiment of the present invention is disclosed. This embodiment possesses all of the structure described above relative to FIGS. 1-10. However, in addition, it possesses a supplemental band 40 having its central portion 41 sewn to fly flap 15. Band 40 has hook fabric 42 at one end thereof and pile fabric 43 at the opposite end thereof. Band 40 is wrapped around body portion 11 after fly 15 has been closed and hook and pile fabrics 42, 43 are secured to each other as shown in FIG. 13. Thus, band 40 provides an additional means for securing body portion 11 to the tail.

While preferred embodiments of the present invention have been disclosed, it will be appreciated that it is not limited thereto but may be otherwise embodied within the scope of the following claims.

What is claimed is:

1. A pouch for a horse's tail which has been braided from a plurality of strands and folded lengthwise into a bundle comprising elongated tubular body portion means of planar material having an open end for receiving said braided horse's tail which has been folded lengthwise, a periphery on said body portion means at said open end, a fastening tab having a first portion secured to said body portion means and extending outwardly away from a first location at said periphery at said open end, a second portion on said fastening tab remote from said first portion, a central portion on said tab between said first and second portions for looping through the space between said strands at the base of said braided tail, and fastening means on said second portion for attachment to said body portion means at a second location circumferentially distant from said first location.

2. A pouch for a horse's tail as set forth in claim 1 wherein said second location is substantially diametrically opposed to said first location.

3. A pouch for a horse's tail as set forth in claim 1 wherein said second portion of said tab comprises an elongated portion which forms a T with said central portion, and wherein said fastening means comprise cooperating fastening members between said body member and said elongated portion of said tab, said cooperating fastening members extending lengthwise of said elongated portion and circumferentially of said tubular body portion means.

4. A pouch for a horse's tail as set forth in claim 3 wherein said cooperating fastening members comprises hook and pile fabric.

5. A pouch for a horse's tail as set forth in claim 1 including a fly extending lengthwise of said body portion means away from said periphery.

6. A pouch for a horse's tail as set forth in claim 5 including cooperating fastening members on said fly for permitting selective opening and closing thereof.

7. A pouch for a horse's tail as set forth in claim 6 wherein said cooperating fastening members are hook and pile fabric.

8. A pouch for a horse's tail as set forth in claim 5 wherein said second location is substantially diametrically opposed to said first location.

9. A pouch for a horse's tail as set forth in claim 8 wherein said second portion of said tab comprises an elongated portion which forms a T with said central portion, and wherein said fastening means comprise cooperating fastening members between said body member and said elongated portion of said tab, said cooperating fastening members extending lengthwise of said elongated portion and circumferentially of said tubular body portion means.

10. A pouch for a horse's tail as set forth in claim 9 wherein said cooperating fastening members comprise hook and pile fabric.

* * * * *